US010963179B2

(12) United States Patent
Auvenshine et al.

(10) Patent No.: US 10,963,179 B2
(45) Date of Patent: Mar. 30, 2021

(54) ACCIDENTAL-VOLUME-REMOVAL PREVENTION

(71) Applicant: International Business Machines Corporation, Armonk, NY (US)

(72) Inventors: John J. Auvenshine, Tucson, AZ (US); Dave Kodjo, Sainte-Marthe-sur-le-Lac (CA); Nicolas Andre Druet, Montreal (CA); Marcel Pop, Montreal (CA); Paul Cloutier, Montreal (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/260,968

(22) Filed: Jan. 29, 2019

(65) Prior Publication Data

US 2020/0241786 A1 Jul. 30, 2020

(51) Int. Cl.
*G06F 3/06* (2006.01)

(52) U.S. Cl.
CPC .......... *G06F 3/0644* (2013.01); *G06F 3/067* (2013.01); *G06F 3/0607* (2013.01); *G06F 3/0632* (2013.01); *G06F 3/0652* (2013.01); *G06F 3/0653* (2013.01)

(58) Field of Classification Search
CPC .... G06F 3/0607; G06F 3/0632; G06F 3/0644; G06F 3/0652; G06F 3/0653; G06F 3/067
See application file for complete search history.

(56) References Cited

U.S. PATENT DOCUMENTS

| 5,978,914 | A | 11/1999 | Carley et al. |
| 8,549,243 | B2 | 10/2013 | Coronado et al. |
| 9,037,825 | B1* | 5/2015 | Donlan ................. G06F 3/0619 707/687 |
| 2014/0372636 | A1 | 12/2014 | Li-On |
| 2016/0259573 | A1 | 9/2016 | Brettell et al. |
| 2016/0274807 | A1* | 9/2016 | Miyahara .............. G06F 3/0605 |

FOREIGN PATENT DOCUMENTS

CN 106843727 A 1/2017

OTHER PUBLICATIONS

Hewlett Packard, "Replication and Disaster Recovery Guide for File Persona," Technical White Paper, Aug. 2017.

(Continued)

*Primary Examiner* — Aracelis Ruiz

(74) *Attorney, Agent, or Firm* — Nelson and Nelson; Daniel P. Nelson

(57) ABSTRACT

A method to prevent the inadvertent removal of volumes on a storage system is disclosed. In one embodiment, such a method includes receiving a request to remove (e.g., delete, detach, unmask, etc.) a volume on a storage system. In response to receiving the request, the method initiates at least one process to monitor the volume for I/O activity over a specified period of time. In the event the at least one process does not detect I/O activity to the volume during the specified period of time, the method executes the request by removing the volume. In the event the at least one process detects I/O activity to the volume during the specified period of time, the method denies the request to remove the volume. A corresponding system and computer program product are also disclosed.

20 Claims, 6 Drawing Sheets

(56) References Cited

OTHER PUBLICATIONS

Ramokapane, Kopo, et al. "Assured Deletion in the Cloud: Requirements, Challenges and Future Directions," CCSW '16 Proceedings of the 2016 ACM on Cloud Computing Security Workshop, Oct. 28, 2016.

Disclosed Anonymously, "Method and System to Restore Volumes for In-Band Virtualization Storage System," IP.com, No. IPCOM000226860D, Apr. 23, 2013.

Disclosed Anonymously, "Method and System for Allowing a Reversible Delete Operation to be Performed on Logical Volumes," IP.com, No. IPCOM000208341D, Jul. 4, 2011.

IBM, "Efficient Secure Data Deletion Scheme for Virtual Disks," IP.com, No. IPCOM000097037D, Mar. 7, 2005.

* cited by examiner

ACCIDENTAL-VOLUME-REMOVAL PREVENTION

BACKGROUND

Field of the Invention

This invention relates to systems and methods for preventing inadvertent removal of volumes.

Background of the Invention

Data is often one of an organization's most valuable assets. Accordingly, it is paramount that an organization protect its data, particularly its business-critical data. Statistics show that a high percentage of organizations, as high as fifty percent, are unable to recover from an event of significant data loss, regardless of whether the loss is the result of a virus, data corruption, physical disaster, software or hardware failure, human error, or the like. At the very least, significant data loss can result in lost income, missed business opportunities, and/or substantial legal liability. Accordingly, it is important that an organization implement adequate policies and procedures to prevent such losses from occurring.

In many cases, data is organized in storage units referred to as volumes (also referred to as logical units, or LUNs). In some cases, an organization may utilize many thousands of volumes to store its data. When volumes are no longer needed, the volumes may be removed (e.g., deleted, detached, unmasked, etc.). Deleting a volume may erase or lose data whereas detaching or unmasking a volume may disconnect the volume from an operating server in a way that disrupts access to the data. In some cases, an organization may follow a process to identify which volumes should be removed and to ensure that currently needed or utilized volumes are not removed. Unfortunately, due to the large numbers of volumes that are often involved, some volumes that are needed or currently being used are inadvertently removed. For example, a single mistaken character or number in the name of a volume identified for removal may lead to the inadvertent removal of another volume. This can result in data loss, outages, data corruption, and/or require difficult or costly data restoration procedures to restore the removed volume.

In view of the foregoing, what are needed are systems and methods to prevent the inadvertent removal of volumes. Ideally, such systems and methods will function with storage systems that do not include built-in volume protection features.

SUMMARY

The invention has been developed in response to the present state of the art and, in particular, in response to the problems and needs in the art that have not yet been fully solved by currently available systems and methods. Accordingly, systems and methods have been developed to prevent the inadvertent removal of volumes on a storage system. The features and advantages of the invention will become more fully apparent from the following description and appended claims, or may be learned by practice of the invention as set forth hereinafter.

Consistent with the foregoing, a method to prevent the inadvertent removal of volumes on a storage system is disclosed. In one embodiment, such a method includes receiving a request to remove (e.g., delete, detach, unmask, etc.) a volume on a storage system. In response to receiving the request, the method initiates at least one process to monitor the volume for I/O activity over a specified period of time. In the event the at least one process does not detect I/O activity to the volume during the specified period of time, the method executes the request by removing the volume. In the event the at least one process detects I/O activity to the volume during the specified period of time, the method denies the request to remove the volume.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
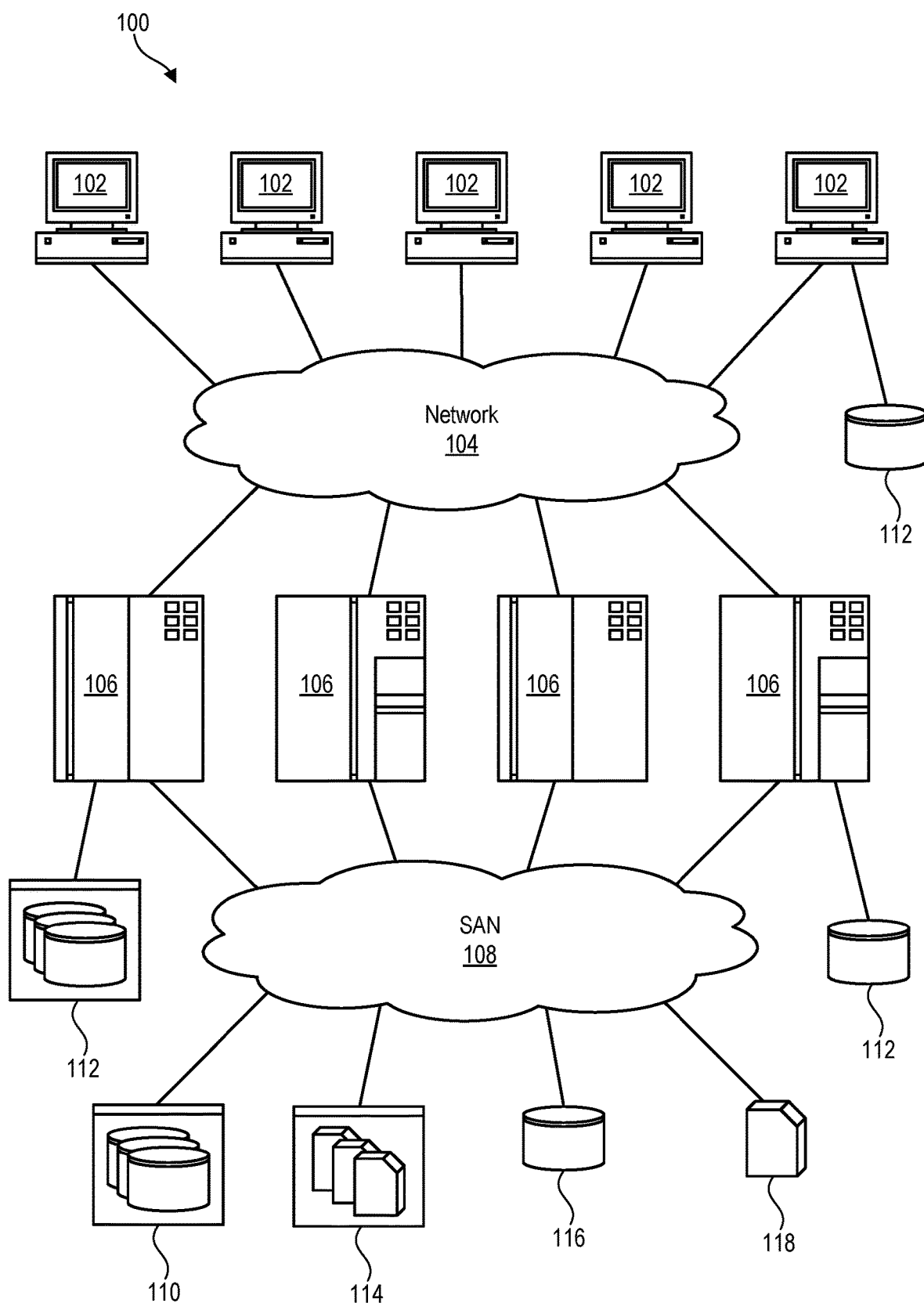
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 114, individual hard-disk drives 116 or solid-state drives 116, tape drives 118, CD-ROM libraries, or the like. To access a storage system 110, 114, 116, 118, a host system 106 may communicate over physical connections from one or more ports on the host 106 to one or more ports on the storage system 110, 114, 116, 118. A connection may be through a switch, fabric, direct connection, or the like. In certain embodiments, the servers 106 and storage systems 110, 114, 116, 118 may communicate using a networking standard such as Fibre Channel (FC) or iSCSI.

Figure 2:
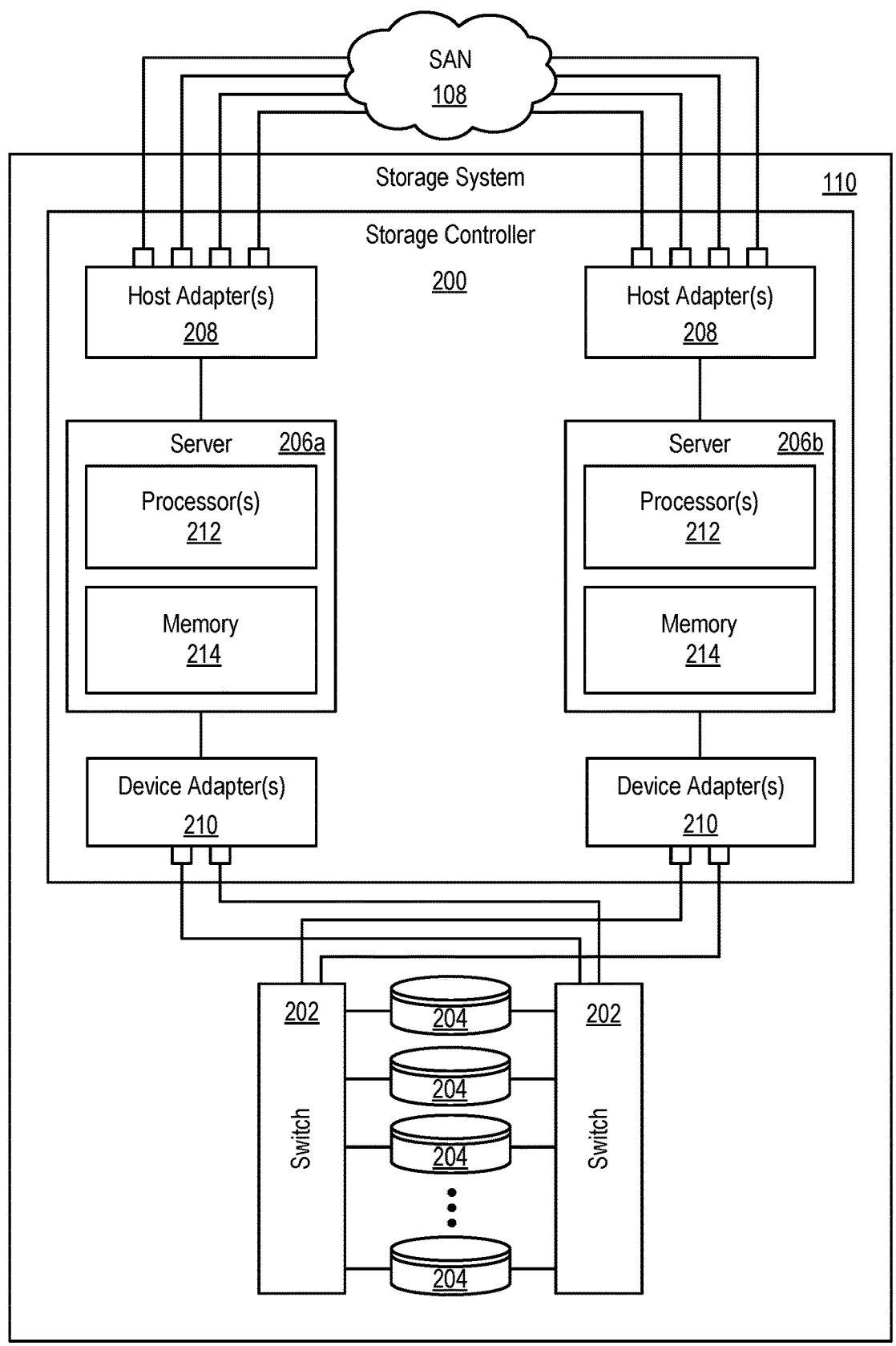
FIG. 2 is a high-level block diagram showing one embodiment of a storage system for use in the network environment of FIG. 1.

Referring to FIG. 2, one example of a storage system 110 containing an array of hard-disk drives 204 and/or solid-state drives 204 is illustrated. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
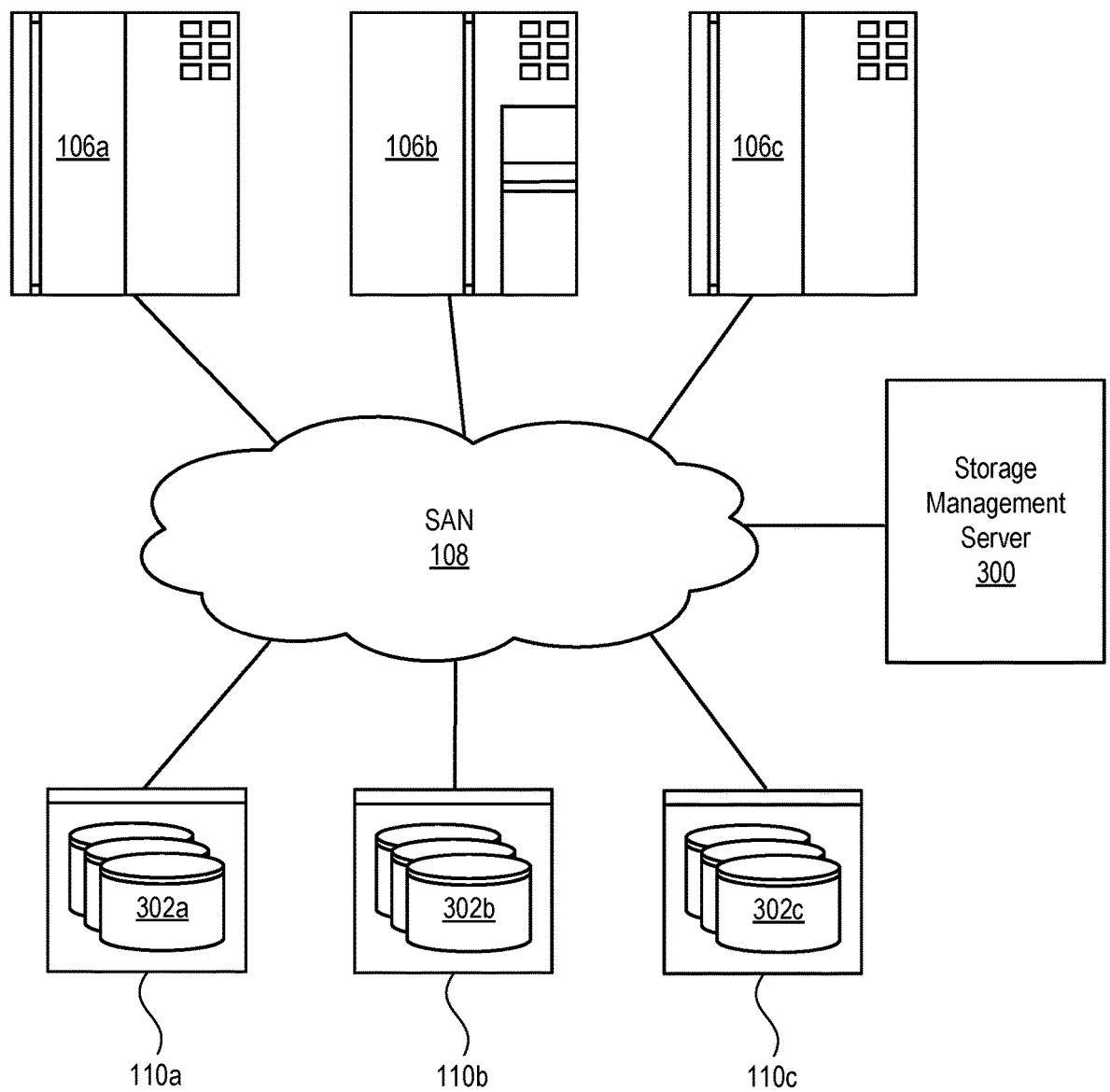
FIG. 3 shows a storage management server for managing volumes on various storage systems.

Referring to FIG. 3, as previously mentioned, data may be organized in storage units referred to as volumes 302 (also referred to as logical units 302, or LUNs 302). In some cases, an organization may utilize many thousands of volumes 302 to store its data. When volumes 302 are no longer needed, the volumes 302 may be removed (e.g., deleted, detached, unmasked, etc.). Deleting a volume may erase or lose data whereas detaching or unmasking a volume may disconnect the volume from an operating server in a way that disrupts access to the data. In certain cases, an organization may follow a process to identify which volumes 302 should be removed and to ensure that currently needed or utilized volumes 302 are not removed. Unfortunately, due to the large numbers of volumes 302 that are often involved, some volumes 302 that are needed or currently being used may be inadvertently removed. For example, a single mistaken character or number in the name of a volume 302 identified for removal may lead to the inadvertent removal of another volume 302. This can lead to data loss, outages, data corruption, and/or require difficult or costly data restoration procedures to restore the removed volume 302.

In some cases, an organization's volumes 302 may be spread across a multitude of different storage systems 110a-c. In certain embodiments, the storage volumes 302a-c on these storage systems 110a-c may be managed by an external entity such as a storage management server 300. The storage management server 300 may manage tasks such as creating, modifying, or removing volumes 302 on the storage systems 110. In some cases, the storage management server 300 may be configured to manage storage volumes 302 on storage systems 110 from different vendors. These storage systems 110 may have different vendor-specific features/characteristics, and respond to different vendor-specific commands.

Figure 4:
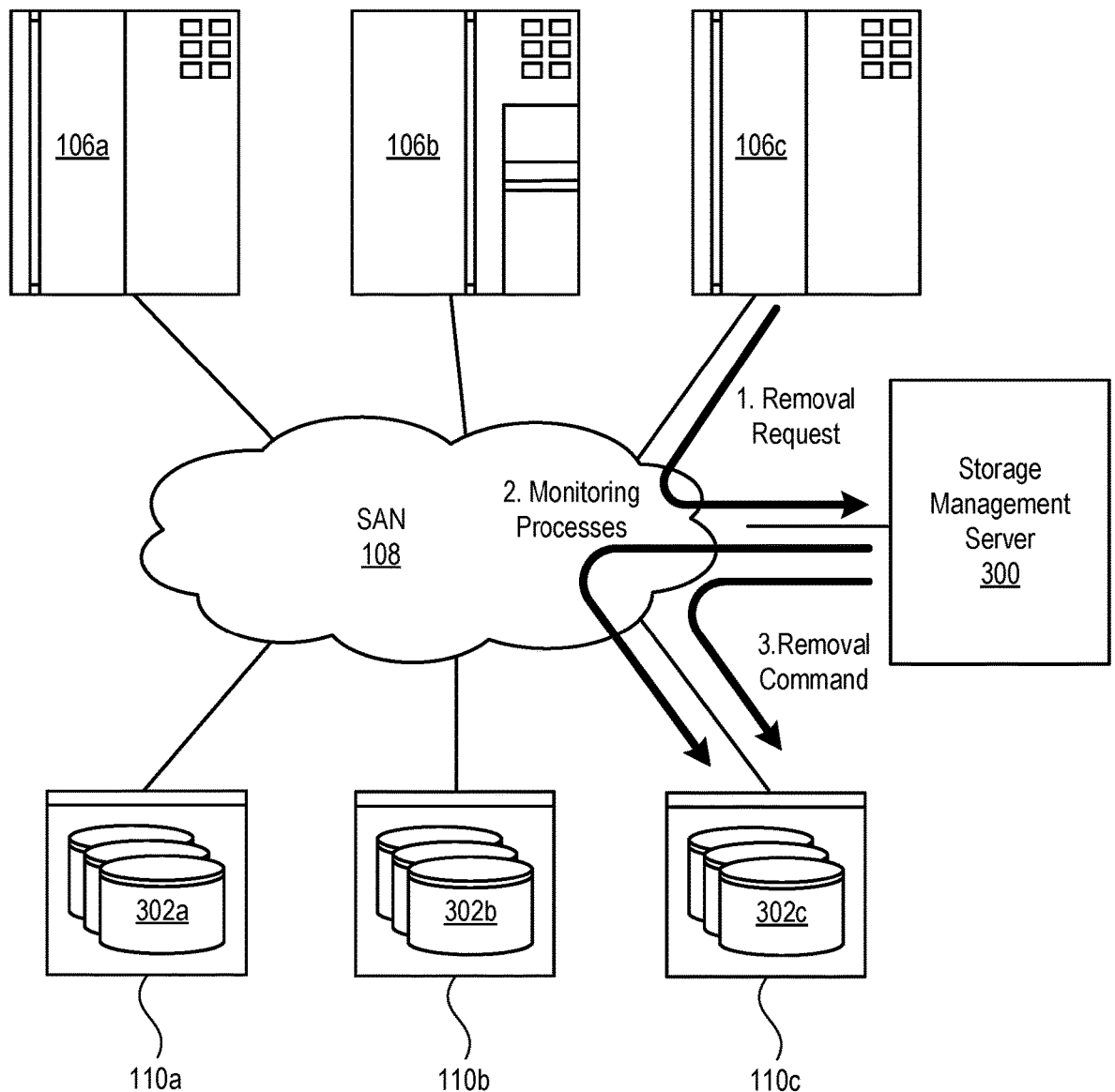
FIG. 4 shows a method for processing removal requests using a storage management server.

Referring to FIG. 4, in certain embodiments, a storage management server 300 in accordance with the invention may be configured to implement safeguards to ensure that storage volumes 302 are not inadvertently removed on the storage systems 110. For example, when a removal request is (1) received by the storage management server 300 to remove (e.g., delete, detach, unmask, etc.) a volume 302 on a storage system 110 managed by the storage management server 300, the storage management server 300 may take various actions to ensure that the volume 302 has not been incorrectly identified for removal.

In general, as will be explained in more detail hereafter, the storage management server 300 may, instead of immediately removing a volume 302 identified for removal, (2) dispatch one or more monitoring processes (e.g., scripts, compiled programs, assembly language, hardware-embedded processes, etc.). These monitoring processes may monitor for I/O activity (i.e., reads and/or writes) to the volume 302 identified for removal. In the event no I/O activity is detected on the volume 302 for a specified period of time, the storage management server 300 may (3) execute the removal request by removing (e.g., deleting, detaching, unmasking, etc.) the volume 302. If, on the other hand, I/O activity is detected on the volume 302 during the specified period of time, this may indicate that the volume 302 is still being used and may have been incorrectly identified for removal. In such a case, the storage management server 300 may deny the removal request by not removing the volume 302.

Figure 5:
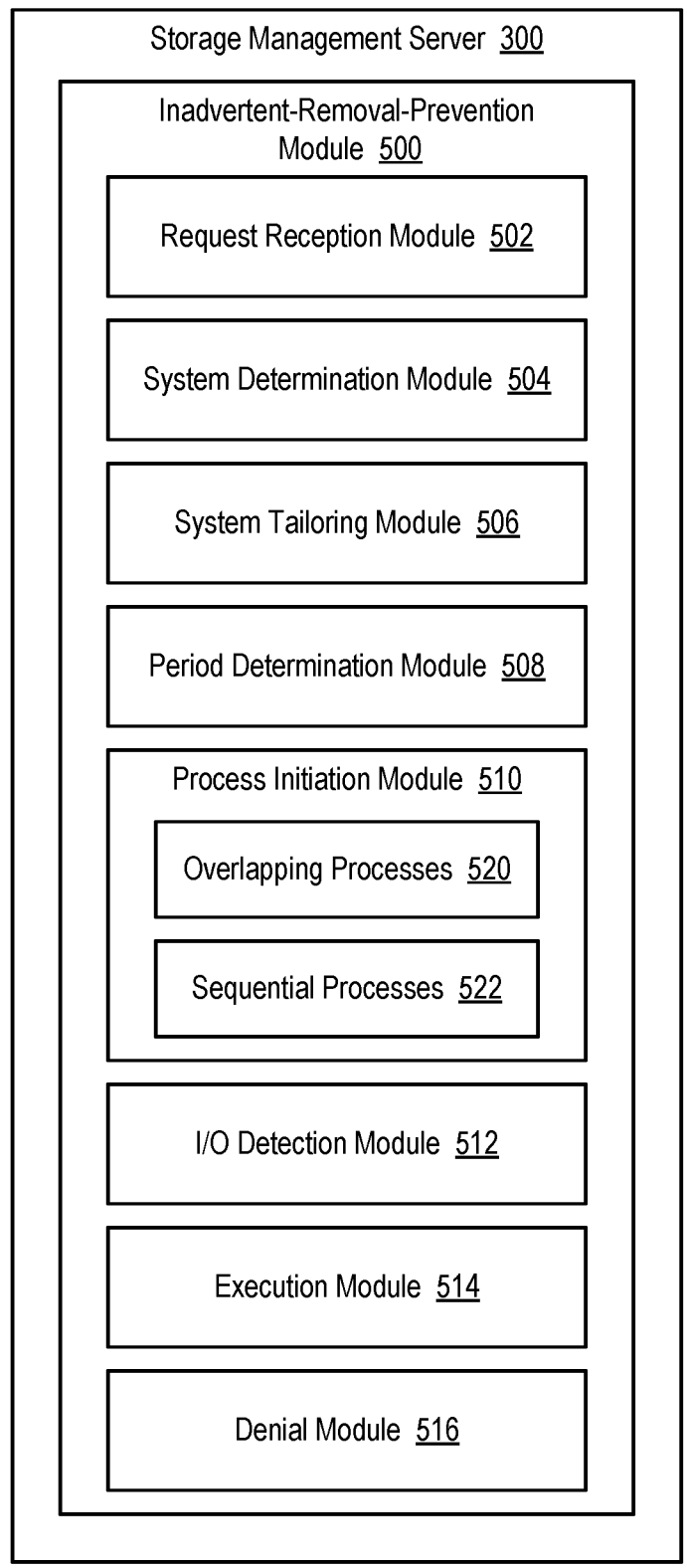
FIG. 5 is a high-level block diagram showing an inadvertent-removal-prevention module implemented within the storage management server.

Referring to FIG. 5, a high-level block diagram showing one embodiment of an inadvertent-removal-prevention module 500 in accordance with the invention is illustrated. The inadvertent-removal-prevention module 500 may, in certain embodiments, be implemented in the storage management server 300 previously discussed. The inadvertent-removal-prevention module 500 may prevent inadvertent removal of volumes 302 on storage systems 110 managed by the storage management server 300. The inadvertent-removal-prevention module 500 may include various sub-modules to provide various features and functions. These modules may be implemented in hardware, software, firmware, or combinations thereof. The sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the inadvertent-removal-prevention module 500 may include one or more of a request reception module 502, system determination module 504, system tailoring module 506, period determination module 508, process initiation module 510, I/O detection module 512, execution module 514, and denial module 516.

The request reception module 502 may receive a removal request associated with a particular volume 302. This removal request may include identifying information (e.g., a volume name, etc.) that identifies the volume 302 to be removed. Upon receiving the removal request, the system determination module 504 determines the type of storage system 110 that hosts the volume 302 to be removed. Identifying the type of storage system 110 may assist in identifying features/characteristics of the storage system 110, and commands the storage system 110 will accept/understand to monitor I/O activity to the volume 302 identified for removal. Once the type of storage system 110 is determined, the system tailoring module 506 may tailor I/O monitoring procedures to the particular storage system 110.

The period determination module 508 may determine a period of time (e.g., twenty-four hours, one week, etc.) to monitor I/O activity to the volume 302 to be removed. This may be a set period of time or a user-tunable period of time. A longer period of time may provide greater assurance that a volume 302 identified for removal is no longer receiving I/O activity, while a shorter period of time may reduce the amount of time between the time that a volume 302 is identified for removal and the time it is actually removed.

Once the type of storage system 110 and the period of time have been identified, the process initiation module 510 may initiate one or more processes to monitor I/O activity to the volume 302 identified for removal. In certain embodiments, the process initiation module 510 initiates overlapping processes 520. This may be performed with storage systems 110 that limit an amount of time that a volume 302 can be monitored for I/O activity. For example, if the storage system 110 limits I/O monitoring to one hour, the process initiation module 510 may initiate a first process to monitor I/O activity to the volume 302, and initiate a second process thirty minutes later to monitor I/O activity to the same volume 302. These overlapping processes may be re-executed over the specified period of time to monitor for I/O activity to the volume 302. The overlapping processes 520 will ensure there are no gaps where I/O activity occurs but goes undetected on the volume 302.

With other types of storage systems 110, sequential processes 522 (e.g., a second process that is initiated when a first process ends) may be sufficient to detect I/O activity on a volume 302. For example, certain types of storage systems 110 may be configured to keep a running total of I/O operations to a particular volume 302. In such cases, overlapping processes 520 may not be needed since I/O activity may be detected simply by observing a change to the running total.

The I/O detection module 512 may be configure to detect when I/O activity occurs to a particular volume 302 (using data returned by the processes, for example) over the specified period of time. When I/O activity is detected during the specified period of time, the denial module 516 may deny the removal request that was received by the request reception module 502 by not removing the volume 302. In certain embodiments, a removal request that is denied may trigger a message that indicates that a volume 302 has not been removed as requested. This may enable a user to determine if the volume 302 was identified for removal in error and/or inform the user that the volume 302 is still active and should not be removed. On the other hand, if the I/O detection module 512 does not detect I/O activity to the volume 302 over the specified period of time, the execution module 514 may execute the removal request by removing the volume 302.

Figure 6:
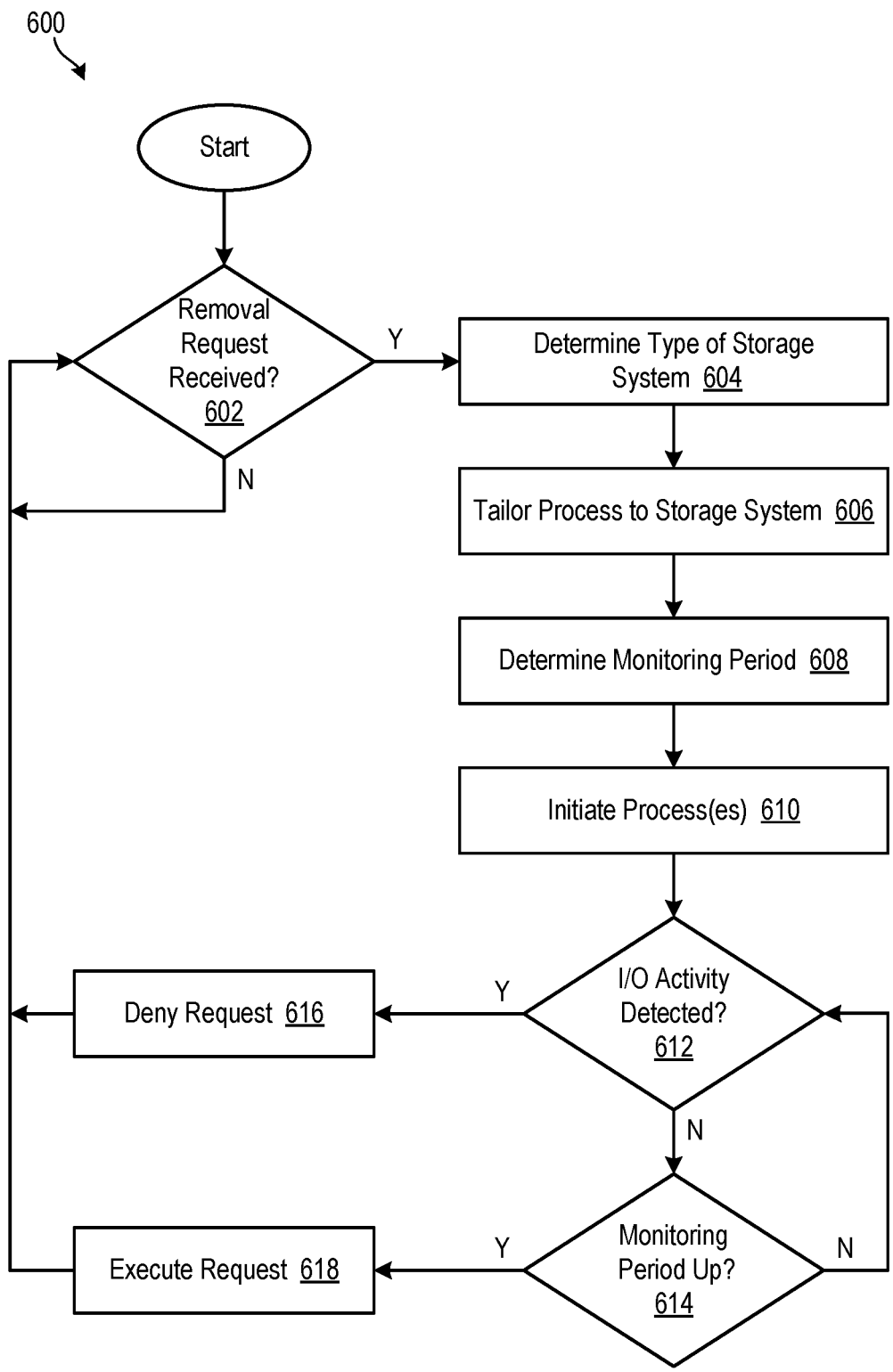
FIG. 6 is a flow diagram showing one embodiment of a method for preventing the inadvertent removal of volumes.

Referring to FIG. 6, one embodiment of a method 600 for preventing inadvertent removal of volumes 302 is presented. Such a method 600 may, in certain embodiments, be executed by the inadvertent-removal-prevention module 500 previously described. As shown, the method 600 initially determines 602 whether a removal request has been received for a particular volume 302. If so, the method 600 determines 604 the type of storage system 110 that hosts the volume 302 and tailors 606 processes to the type of storage system 110. The method 600 may also determine 608 the period of time over which the volume 302 is to be monitored. The monitoring processes may then be initiated 610 to monitor I/O activity to the volume 302 that has been identified for removal.

Once the processes have been initiated 610, the method 600 determines 612 whether any I/O activity has been detected on the volume 302 during the specified period of time. If so, the method 600 denies 616 the removal request. The method 600 may then return to the top to wait 602 for the next removal request. If no I/O activity has been detected, the method 600 determines 614 whether the specified period of time has passed. These steps 612, 614 may be repeated until I/O activity is detected on the volume 302 or the specified period of time has passed. If the specified period of time has passed and no I/O activity was detected on the volume 302, the method 600 executes 618 the removal request by removing the volume 302. The method 600 then returns to the top to wait 602 for the next removal request.

The systems and methods disclosed herein are advantageous for various reasons. For example, the disclosed systems and methods enable removal requests to be processed safely without requiring a storage system 110 containing a volume 302 identified for removal to have built-in inadvertent-removal protections. The disclosed systems and methods protect users from inadvertently selecting a volume 302 that is in use and causing an outage or data loss by removing the volume 302. Users are able to utilize the disclosed systems and methods with a wide variety of storage systems 110 from different vendors instead of being limited to certain storage systems 110. Users with existing investments in storage systems 110 which do not have built-in inadvertent-removal protections can continue to use those systems 110 while gaining additional protections in the storage management server 300. This is because the inadvertent-removal protections may be implemented external to the storage systems 110 and do not depend on particular firmware capabilities or versions on the storage system 110. The disclosed inadvertent-removal protection features are also configured to handle limited I/O monitoring periods that exist on some storage systems 110 using, for example, the overlapping and/or sequential processes previously described. The disclosed systems and methods are vendor-neutral and can apply to multiple storage systems 110 in a data center, including storage systems 110 from multiple different vendors.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to prevent inadvertent removal of volumes on a storage system, the method comprising:
   receiving a request to remove a volume on a storage system;
   designating a specified period of time over which to monitor the volume for I/O activity that is initiated after the request has been received;
   in response to receiving the request, initiating at least one process to monitor the volume for I/O activity over the specified period;
   in the event the at least one process does not detect I/O activity to the volume during the specified period, executing the request by removing the volume; and
   in the event the at least one process detects I/O activity to the volume during the specified period, denying the request to remove the volume.

2. The method of claim 1, wherein initiating the at least one process comprises initiating a plurality of processes end-to-end during the specified period of time.

3. The method of claim 1, wherein initiating the at least one process comprises initiating a plurality of processes that at least partially overlap in time during the specified period of time.

4. The method of claim 1, wherein the at least one process runs external to the storage system.

5. The method of claim 1, wherein the at least one process checks for the I/O activity using a command that is native to the storage system.

6. The method of claim 1, wherein the at least one process is configured to bridge limited I/O monitoring periods of the storage system.

7. The method of claim 1, wherein removing comprises at least one of deleting, detaching, and unmasking.

8. A computer program product to prevent inadvertent removal of volumes on a storage system, the computer program product comprising a computer-readable medium having computer-usable program code embodied therein, the computer-usable program code configured to perform the following when executed by at least one processor:
   receive a request to remove a volume on a storage system;
   designate a specified period of time over which to monitor the volume for I/O activity that is initiated after the request has been received;
   in response to receiving the request, initiate at least one process to monitor the volume for I/O activity over the specified period;
   in the event the at least one process does not detect I/O activity to the volume during the specified period, execute the request by removing the volume; and
   in the event the at least one process detects I/O activity to the volume during the specified period, deny the request to remove the volume.

9. The computer program product of claim 8, wherein initiating the at least one process comprises initiating a plurality of processes end-to-end during the specified period of time.

10. The computer program product of claim 8, wherein initiating the at least one process comprises initiating a plurality of processes that at least partially overlap in time during the specified period of time.

11. The computer program product of claim 8, wherein the at least one process runs external to the storage system.

12. The computer program product of claim 8, wherein the at least one process checks for the I/O activity using a command that is native to the storage system.

13. The computer program product of claim 8, wherein the at least one process is configured to bridge limited I/O monitoring periods of the storage system.

14. The computer program product of claim 8, wherein removing comprises at least one of deleting, detaching, and unmasking.

15. A system to prevent inadvertent removal of volumes on a storage system, the system comprising:
   at least one processor;
   at least one memory device coupled to the at least one processor and storing instructions for execution on the at least one processor, the instructions causing the at least one processor to:
   receive a request to remove a volume on a storage system;
   designate a specified period of time over which to monitor the volume for I/O activity that is initiated after the request has been received;
   in response to receiving the request, initiate at least one process to monitor the volume for I/O activity over the specified period;
   in the event the at least one process does not detect I/O activity to the volume during the specified period, execute the request by removing the volume; and
   in the event the at least one process detects I/O activity to the volume during the specified period, deny the request to remove the volume.

16. The system of claim 15, wherein initiating the at least one process comprises initiating a plurality of processes end-to-end during the specified period of time.

17. The system of claim 15, wherein initiating the at least one process comprises initiating a plurality of processes that at least partially overlap in time during the specified period of time.

18. The system of claim 15, wherein the at least one process runs external to the storage system.

19. The system of claim 15, wherein the at least one process checks for the I/O activity using a command that is native to the storage system.

20. The system of claim 15, wherein the at least one process is configured to bridge limited I/O monitoring periods of the storage system.

* * * * *